US009842415B2

(12) United States Patent
Bernard et al.

(10) Patent No.: US 9,842,415 B2
(45) Date of Patent: Dec. 12, 2017

(54) METHOD FOR PROCESSING TOMOSYNTHESIS ACQUISITIONS IN ORDER TO OBTAIN A REPRESENTATION OF THE CONTENTS OF AN ORGAN

(75) Inventors: Sylvain Bernard, Montigny le Bretonneux (FR); Razvan Iordache, Paris (FR); Henri Souchay, Versailles (FR)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 24 days.

(21) Appl. No.: 12/975,583

(22) Filed: Dec. 22, 2010

(65) Prior Publication Data

US 2011/0150178 A1 Jun. 23, 2011

(30) Foreign Application Priority Data

Dec. 22, 2009 (FR) .................................... 09 59374

(51) Int. Cl.
*G06T 11/00* (2006.01)

(52) U.S. Cl.
CPC ... *G06T 11/008* (2013.01); *G06T 2207/10112* (2013.01); *G06T 2211/436* (2013.01)

(58) Field of Classification Search
CPC .................. A61B 6/03; G06T 11/008; G06T 2207/10112; G06T 2211/436
USPC ...................................... 378/21–26; 382/131
See application file for complete search history.

(56) References Cited

U.S. PATENT DOCUMENTS

| | | | |
|---|---|---|---|
| 6,144,759 A * | 11/2000 | Weese et al. | 382/132 |
| 6,473,634 B1 * | 10/2002 | Barni | 600/425 |
| 7,693,254 B2 | 4/2010 | Muller et al. | |
| 7,697,661 B2 | 4/2010 | Souchay et al. | |
| 2003/0007598 A1 | 1/2003 | Wang et al. | |
| 2003/0095719 A1 * | 5/2003 | Porikli | 382/276 |
| 2004/0052328 A1 * | 3/2004 | Sabol et al. | 378/37 |
| 2005/0113681 A1 * | 5/2005 | DeFreitas et al. | 600/426 |
| 2006/0098855 A1 * | 5/2006 | Gkanatsios et al. | 382/128 |
| 2007/0036265 A1 | 2/2007 | Jing et al. | |
| 2007/0242868 A1 | 10/2007 | Stanton et al. | |
| 2008/0025592 A1 * | 1/2008 | Jerebko et al. | 382/132 |
| 2008/0130979 A1 * | 6/2008 | Ren et al. | 382/132 |
| 2009/0080752 A1 | 3/2009 | Ruth et al. | |

(Continued)

FOREIGN PATENT DOCUMENTS

| | | |
|---|---|---|
| EP | 1792569 A2 | 6/2007 |
| FR | 2881338 A1 | 8/2006 |

(Continued)

OTHER PUBLICATIONS

Claus et al., Generalized Filtered Back-Projection Reconstruction in Breast Tomosynthesis, 2006, IWDM 2006, LNCS 4046, pp. 167-174.*

(Continued)

*Primary Examiner* — Glen Kao (57) ABSTRACT

A method for processing tomosynthesis images of an object of interest, using an imaging system, the imaging system comprising an X-ray source positioned facing a detector on which the object of interest is positioned. With the method of an embodiment of the invention, it is possible to display a three-dimensional (3D) reconstruction slice, as well as a two-dimensional (2D) image of the object of interest.

17 Claims, 3 Drawing Sheets

(56) References Cited

U.S. PATENT DOCUMENTS

| | | | |
|---|---|---|---|
| 2009/0080765 A1* | 3/2009 | Bernard | G06T 11/006 382/154 |
| 2009/0123052 A1* | 5/2009 | Ruth et al. | 382/132 |
| 2010/0135558 A1 | 6/2010 | Ruth et al. | |
| 2010/0226475 A1* | 9/2010 | Smith et al. | 378/37 |

FOREIGN PATENT DOCUMENTS

| | | |
|---|---|---|
| FR | 2882246 A1 | 8/2006 |
| FR | 2890553 A1 | 3/2007 |
| FR | 2905256 A1 | 3/2008 |
| FR | 2939019 A1 | 6/2010 |

OTHER PUBLICATIONS

Jong et al., Contrast-enhanced Digital Mammography: Initial Clinical Experience, 2003, Radiography, vol. 228, No. 3, pp. 842-850.*

Bushberg et al., The Essential Physics of Medical Imaging, 2002, Published by Lippincott Williams & Wilkins, Second Edition, ISBN 0-683-30118-7, p. 85.*

Pisano et al., Image Processing Algorithms for Digital Mammography: A Pictorial Essay, Radiographics 2000, vol. 20, pp. 1479-1491.*

Wu et al., "A comparison of reconstruction algorithms for breast tomosynthesis", Medical Physics, vol. 31, Issue No. 9, pp. 2636-2647, Sep. 1, 2004.

Unofficial translation of French Search Report and Written Opinion from FR Application No. 0959374 dated Jul. 13, 2010.

Diederich et al., "Detection of Pulmonary Nodules at Spiral CT: Comparison of Maximum Intensity Projection Sliding Slabs and Single-Image Reporting", European Radiology, vol. No. 11, Issue No. 8, pp. 1345-1350, 2001.

Amendment Response to EPO Office Action dated Oct. 7, 2014.

Unofficial translation of FR Search Report and Written Opinion issued from FR Application No. 1059410 dated Feb. 25, 2011.

Diekmann, et al., Thick Slices from Tomosynthesis Data Sets: Phantom Study for the Evaluation of Different Algorithms, 2009, Journal of Digital Imaging, Volumn 22, No. 5, pp. 519-526.

Meyer, softMip "Development of a new projection algorithm for the digital cross-sectional imaging and evaluation based on Ultra-low-dose CT scans for suspected calcification in the urinary tract", 2005, Dissertation, University of Medicine in Berlin, 103 pages.

Claus et al., "Preference Study of Reconstructed Image Quality in Mammographic Tomosynthesis", IWDM, pp. 517-521, 2003.

Wheeler et al., "Micro-Calcification Detection in Digital Tomosynthesis Mammography", Proc. of SPIE, vol. No. 6144, pp. 20-1 to 20-12, 2006.

Final Rejection towards related U.S. Appl. No. 13/284,029 dated Jul. 6, 2015.

U.S. Non-Final Office Action issued in connection with Related U.S. Appl. No. 13/284,029 dated Sep. 15, 2016.

* cited by examiner

FIG. 6

METHOD FOR PROCESSING TOMOSYNTHESIS ACQUISITIONS IN ORDER TO OBTAIN A REPRESENTATION OF THE CONTENTS OF AN ORGAN

FIELD OF THE INVENTION

The field of the invention relates to the processing and display of tomosynthesis images and radiography images of an object of interest.

More specifically, it relates to a method for processing tomosynthesis images of an object of interest in order to obtain three-dimensional (3D) reconstructed slices as well as a two-dimensional (2D) image of the object of interest.

It also relates to a method for displaying said slices and said image in order to rapidly switch from the 2D image to reconstructed slices and vice versa and to systems and products of computer programs for applying such method.

DESCRIPTION OF RELATED ART

Radiography is generally used for seeking abnormalities in an object of interest. We will be in particular interested in mammography which has been used for decades for screening and diagnosing breast cancer but the invention may also be applied to conventional radiography.

A radiography image represents a projection of an object of interest. It is generally obtained by placing the object between a source emitting X-rays and a detector of X-rays, so that the rays attain the detector after having crossed the object. The radiography image is then constructed from data provided by the detector and represents the object of interest projected on the detector in the direction of the X-rays.

In this image, an experienced radiologist may distinguish radiological signs indicating a potential problem, for example microcalcification or opacities in the case of mammography.

However, in a 2D projection image, superposition of the tissues may hide lesions, but in no case is their actual position known in the object of interest, the practitioner not having any information on the position of the radiological sign in the projection direction.

Tomosynthesis has been recently developed in order to meet these problems; with it, a 3D representation of an object of interest may be obtained as a series of successive slices. These slices are reconstructed from projections of the object of interest under various angles. To do this, the object of interest is generally placed between a source emitting X-rays and a detector of X-rays. The source and/or the detector are mobile, so that the direction of projection of the object on the detector may vary (typically over an angular range of 30°). Several projections of the object of interest are thereby obtained under different angles, from which a three-dimensional representation of the object of interest may be reconstructed, generally by a reconstruction method well-known to one skilled in the art.

For each projection, the radiation doses of the rays are naturally less than those used for standard mammography. For example, by noting as D the radiation dose by standard mammography, and as N the number of projections used for tomosynthesis, the radiation dose used for each projection is of the order of D/N.

Thus, upon browsing the tomosynthesis slices of an object of interest, a practitioner may detect radiological signs in the object of interest and evaluate their 3D position.

However, practitioners have years of experience in analyzing images from mammographies, while analysis of tomosynthesis slices is still at its beginning.

Thus, a transition period proves to be preferable, a period during which the practitioners are led to analyzing tomosynthesis slices of an object of interest accompanied by standard mammography images of a same object of interest, with the purpose of acquiring experience and ease in analyzing 3D representation slices and of comparing with previous 2D acquisitions in order to appreciate the change over time of the radiological signs.

From this point of view, investigations have been conducted in order to produce systems for acquiring radiography images with which 2D mammography images and tomosynthesis slices of a same object of interest may be obtained.

Document EP 1 792 569 proposes an example of such a system, comprising an X-ray emitting source with variable radiation dosage, so that the emitted radiation dose may be adapted either to tomosynthesis projections, or to mammography.

However, this system emits more radiations than a mammography acquisition system, or a tomosynthesis acquisition system; it emits about as much as both combined.

Also, there is an actual need for having a system for acquiring radiography images with which 2D mammography images and tomosynthesis slices of a same object of interest may be obtained, without the radiation dose emitted for these acquisitions exceeding that of the systems of the prior art, in particular that of 2D mammography systems.

Two methods for reconstructing a 2D image resembling a standard mammography image have been tested by the applicant. These methods however have drawbacks.

A first method consists of taking quite simply for a 2D image a tomosynthesis projection, preferentially at zero angle, i.e. when the tube is orthogonal to the detector. This method cannot be an actual solution to the stated problem, in the sense that the radiation dose emitted for a tomosynthesis projection is too small; the information collected on the detector is then buried in quantum noise, and does not allow localization of weakly contrasted objects, particularly small microcalcifications.

A second method consists of grouping the reconstructed slices in a thick layer (representative of all the successive slices), by carrying out for each pixel of the thick layer an average of the voxels located along the path leading from the pixel to the source (placed perpendicularly to the detector) or by selecting the voxel with maximum intensity (the so-called MIP "Maximum Intensity Projection" method). This method does not give satisfactory results because of reconstruction artifacts particularly generated by backprojection of big objects. Small objects only generate a limited amount of artifacts in the volume. This is why removal of big objects from the projections is proposed by applying a high pass filter before applying the backprojection. Big objects will be brought by the central projection because they are always visible even at a low dose.

BRIEF SUMMARY OF THE INVENTION

With embodiments of the invention it is possible to obtain a 3D reconstruction of an object of interest as well as a 2D image of the object of interest, similar to a standard mammography image, from acquiring tomosynthesis projection of the object of interest, by getting rid of the aforementioned drawbacks.

According to a preferred aspect, an embodiment of the invention relates to a method for processing tomosynthesis images of an object of interest, by means of an imaging system, the imaging system comprising a source of X-rays positioned facing a detector on which the object of interest is positioned.

The method according to the first aspect of the invention comprises the following steps: acquiring a plurality of 2D projection images of the object of interest along a plurality of orientations located relatively to the perpendicular to the detector, applying a filter on the acquired 2D projection images so as to obtain filtered projection images of the object of interest; determining reconstructing slices for reconstructing the object of interest from at least two of the filtered projections, the whole of the reconstructed slices being the filtered reconstructed volume of the object of interest; reprojecting the reconstructed slices along a direction of determined orientation, preferably in the direction of so-called zero orientation, in order to obtain an intermediate 2D image of the object of interest; and obtaining a final 2D image of the object of interest by combining the intermediate 2D image and the projection image corresponding to the determined orientation.

The method according to the first aspect of the invention is advantageously completed by the following features, taken alone or in any of their technically possible combinations:

the filter applied to the projection images is a high pass filter, the characteristics of which preferably depend on the thickness of the object of interest;

the reconstructed slices are determined by a non-linear backprojection algorithm;

reprojection of the reconstructed slices is an SIP reprojection in the direction of determined orientation, the SIP reprojection consisting, for each pixel of the intermediate 2D image, in a determination, in a filtered reconstructed volume, of an intensity voxel calculated by using sorting of the pixel values along the ray from the source to the pixel of the intermediate 2D image and in storing in the memory unit of the imaging system, an identifier of the reconstructed slice in which the voxel from the sorting is found, so as to have in the memory unit, information on depth connecting each pixel of the intermediate 2D image to the associated reconstructed slice from which this pixel stems;

reprojection of the reconstructions is an MIP reprojection in the determined orientation direction, the MIP reprojection consisting, for each pixel of the intermediate 2D image, in a determination in the filtered reconstructed volume, of the maximum intensity voxel along the ray from the source to the pixel of the intermediate 2D image and in storing in the memory unit of the imaging system, an identifier of the reconstructed slice in which the maximum intensity voxel is found, so as to have in the memory unit information on depth connecting each pixel of the intermediate 2D image to the associated reconstructed slice from which this pixel stems;

the method comprises a step for determining a volume obtained with a system for automatic detection of lesions, wherein each voxel represents a probability of belonging to a lesion;

the reprojection of the reconstructed slices consists in any pixel of the intermediate 2D image in selecting the voxel with the highest probability of belonging to a lesion along the ray from the source to this pixel, and in storing in this memory unit of the imaging system, an identifier of the reconstructed slice in which the voxel of maximum probability is found, so as to have, in the memory unit, information on depth connecting each pixel of the intermediate 2D image to the associated reconstructed slice from which this pixel stems;

the method further comprises a step of local regularization by the processing unit of the depth information, so as to obtain regularized depth information;

the method comprises prior to the step for determining the final 2D image, a step for applying a filter to the projection image corresponding to the determined orientation so as to obtain a projection image corresponding to the determined orientation, the determination of the final 2D image consisting in the combination of the intermediate 2D image and of the projection image corresponding to the filtered determined orientation, and the filter applied to the projection image corresponding to the determined orientation of the object of interest may be a low pass filter;

the final 2D image is determined for each orientation; each thereby obtained image being intended to be displayed one after the other or else by automatic scrolling;

the method comprises determination and/or displaying slices reconstructed from 2D projection images, the whole of the reconstructed slices displayed being the reconstructed volume of the object of interest.

According to a second aspect, an embodiment of the invention relates to a method for displaying a set of radiography images of an object of interest by a unit for displaying radiography images, the radiographical images being reconstructed slices displaying the object and a final 2D image of the object obtained by a method for processing tomosynthesis images according to the first aspect of the invention, the depth information being stored in the memory unit.

The display method according to the second aspect of the invention comprises the following steps: displaying the final 2D image by means of the display unit; selecting a pixel from the final 2D image; searching from the depth information stored in the memory unit for an identifier of the reconstructed slice associated with the selected pixel; adjusting the size of the reconstructed slice associated with the selected pixel to the size of the final 2D image; displaying, by means of the display unit, the adjusted reconstructed slice associated with the selected pixel.

The method according to the second aspect of the invention may comprise, following the display of the adjusted reconstructed slice, a step for returning to a display of the final 2D image.

According to a third aspect, an embodiment of the invention relates to a method for displaying a set of radiography images of an object of interest by a unit for displaying radiography images, the radiographic images being the object reconstructed slices and a final 2D image of the object obtained by a method for processing tomosynthesis images according to the first aspect of the invention.

The display method according to the third aspect comprises the following steps: displaying a reconstructed slice by means of the display unit; adjusting the size of the final 2D image to the size of the reconstructed slice; displaying on demand from the user, by means of the display unit, the final adjusted 2D image.

The display method according to the third aspect of the invention may comprise following display of the final adjusted 2D image, a step for returning to a display of the reconstructed slice.

According to a fourth aspect, an embodiment of the invention relates to an imaging system comprising an X-ray detector, a source emitting X-rays, a processing unit and means for applying a processing method according to the first aspect of the invention.

According to a fifth aspect, an embodiment of the invention relates to a display system intended to be applied in a processing unit of a medical imaging system according to the fourth aspect of the invention, the processing unit comprising means for applying a display method according to the second and/or the third aspect of the invention.

According to a sixth aspect, an embodiment of the invention relates to a computer program product comprising code instructions recorded on a medium which may be used in a computer, characterized in that it comprises instructions for applying the processing method according to the first aspect of the invention.

According to a seventh aspect, an embodiment of the invention relates to a computer program product comprising code instructions recorded on a medium which may be used in a computer, characterized in that it comprises instructions for applying a display method according to the second and/or the third aspect of the invention.

With the invention, it is possible to obtain, from tomosynthesis projection images of an object of interest, a final 2D image similar to a standard mammography image of the object of interest, a 2D image on which radiological signs of small size, such as microcalcifications and fibres, are more visible than with known methods.

Moreover, the display method according to the second or the third aspect of the invention allows a user practitioner to access very rapidly a reconstructed slice of an object of interest on which is located a radiological sign localized on the final 2D image. Thus, a radiologist practitioner may examine with rapidity and efficiency, reconstructed slices of an object of interest by means of the image similar to a standard mammography image.

BRIEF DESCRIPTION OF THE SEVERAL VIEWS OF THE DRAWINGS

Other characteristics, objects and advantages of the invention will become apparent from the description which follows which is purely illustrative and non-limiting, and which should be read with reference to the appended drawings, wherein.

DETAILED DESCRIPTION OF THE INVENTION

Medical Imaging System

Figure 1:
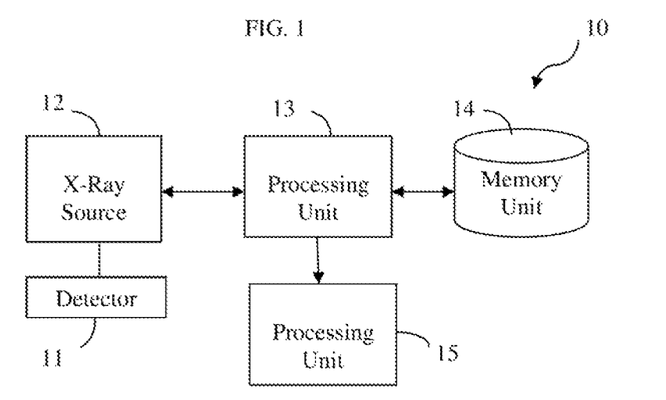
FIG. 1 schematically illustrates an imaging system according to the invention.

FIG. 1 schematically illustrates a medical imaging system 10 for acquiring projection 2D images for reconstructing a 3D image of a region of interest.

The medical imaging system 10 comprises a unit for acquiring images 12, a unit for processing images 13 and a display system 15.

Figure 2:
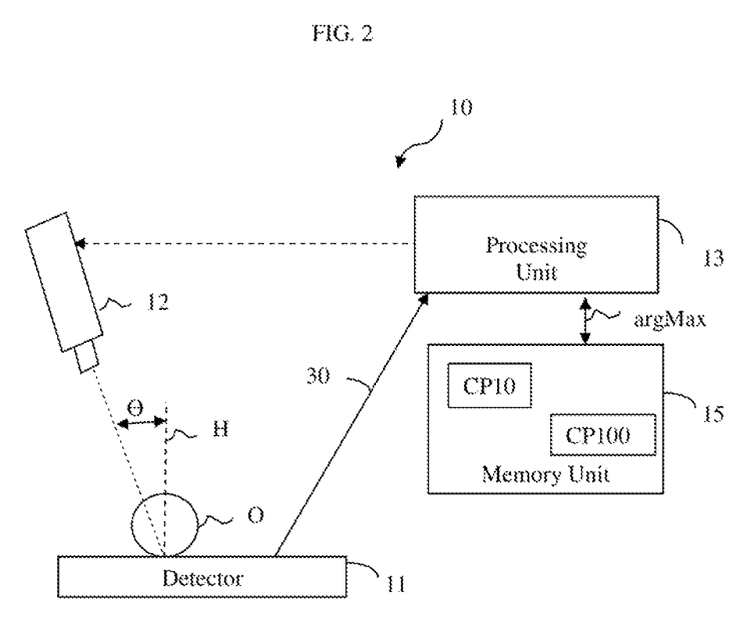
FIG. 2 schematically illustrates a few functionalities of the imaging system.

FIG. 2 schematically illustrates the acquisition unit 12.

The acquisition unit 12 allows acquisition of a plurality of 2D projections of a region of interest O—of an organ—of a patient. The acquisition unit 12 is notably formed by a detector 11 located facing a source 12 of X-rays. The detector 11 for example is a digital camera. The acquisition unit 12 for example is an X-ray acquisition system, the latter comprising any known means allowing emission of X-rays onto the object O and the acquisition of resulting images.

The display unit 15 may be integrated into the image acquisition unit 12 or the image processing unit 13, or be separated from the acquisition unit 12 and from the processing unit 13. The display unit 15 for example, is a computer screen, a monitor, a flat screen, a plasma screen, or any type of display device known commercially. The display unit 15 enables a radiologist practitioner to monitor the reconstruction and/or display of acquired 2D images.

The processing unit 13 is adapted to the application of the processing method (for example for reconstructing a 3D image from 2D images). The processing unit 13 may be integrated into the acquisition unit 12 or be separated from the acquisition unit 12. The processing unit 13 is for example one or more computers, one or more processors, one or more microcontrollers, one or more microcomputers, one or more programmable controllers, one or more application specific integrated circuits, other programmable circuits, or other devices which include a computer such as a workstation.

The processing unit 13 is coupled with memory means 14 which may be integrated to or separated from the processing unit 13. These means may be formed by a hard disk or by any other removable storage means (a CDROM, a diskette, etc.). These storage means may be used for storing a 3D image of the area of the viewed organ, such as an acquired or processed 2D image, this may be a ROM/RAM memory of the processing unit 13, a CDROM, a USB key, a memory of a central server. The processing unit 13 may comprise a reading device (not shown) for example a diskette reader or a CDROM reader, for reading the instructions of the processing method (which will be described subsequently) from a medium of instructions (not shown) such as a diskette or a CDROM. Alternatively, the processing unit 13 executes the instructions of the processing method (which will be described subsequently) stored in micro-software packages (not shown).

Image Processing Method

With the image processing method which we shall describe, an image similar to a mammographic image may be obtained from tomosynthesis images.

It is specified here that by image similar to a mammographic image is meant an image which visually resembles to a full dose standard 2D mammography image.

The image processing method therefore consists of processing radiography images obtained by an imaging system 10 comprising an X-ray source 12 positioned facing a detector 11 on which the object of interest O is positioned.

Figure 3:
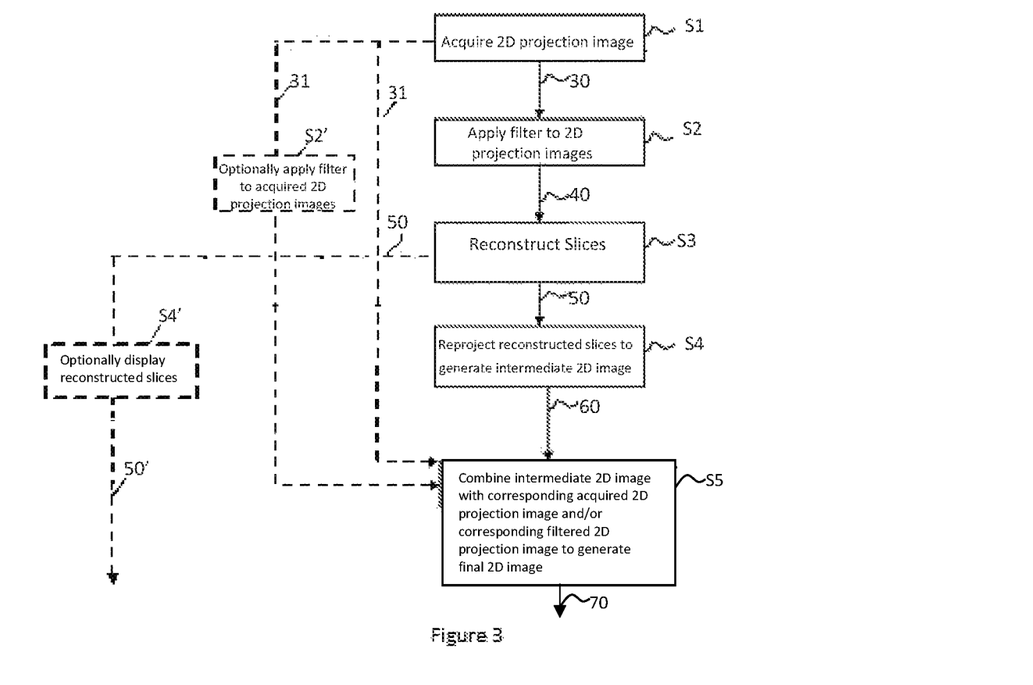
FIG. 3 illustrates, as a block diagram, a method for processing images according to the invention.

FIG. 3 illustrates steps of the method for processing images obtained by tomosynthesis.

In a first step S1, a plurality of 2D projection images 30 of the object of interest O is acquired according to a plurality of orientations, a so-called zero orientation being the closest to the perpendicular H.

It is specified here that each orientation is located with respect to the perpendicular H to the detector 11.

During this first step, a 2D image is in particular acquired according to a determined orientation 31. The determined orientation is preferably the so-called zero orientation.

The method then comprises a step S2 for applying a filter on the acquired 2D projection images 30 so as to obtain filtered projection images 40 of the object of interest O.

This filter is preferably of the high-pass type and its cut-off frequency is preferably a function of the thickness of the object of interest O.

During a step S3, slices 50 are determined for reconstructing the object of interest O. This determination S3 in particular consists in a reprojection of the filtered 2D projection images 40. During step S3, the slices 50 may also be simply outputted as illustrated in FIG. 3.

This back projection may in particular be non-linear of the "Order Statistics Based Backprojection" type. In the linear back projection, each voxel of the volume is reconstructed by using N information pixels, each pixel being determined by backprojection of the voxel in each of the N projections. In the non-linear backprojection, the maximum intensity pixel among the N pixels is not used, which allows significant reduction of the replication artifacts caused by the most intense objects.

It is noted that the slices for reconstructing the object of interest O represent the reconstructed volume of the object of interest O.

Next, during a step S4, a reprojection of the reconstructed slices 50 is carried out in the determined direction. With this, it is possible to obtain an intermediate 2D image 60 of the object of interest O. It is noted that reprojection occurs along the same direction as the projection image corresponding to the determined orientation.

Finally, during a step S5, a final 2D image of the object of interest is obtained by combining the intermediate 2D image 60 and the projection image 30 corresponding to the determined orientation 31. The combination is preferably a pixel-to-pixel linear combination.

The final 2D image 70 is an image similar to a mammography image.

In an advantageous alternative, the final 2D image of the object of interest is determined for each orientation.

The step for re-projecting S4 the reconstructed slices 50 is a preferred implementation, an MIP (Maximum Intensity Pixel) reprojection in the determined orientation direction. More generally, any reprojection using sorting of the values of the pixels present along the rays may be used (SIP, for Sorted Intensity Pixel). The sorting consists in classifying the pixels according to their intensity (increasing or decreasing sorting).

Figure 4:
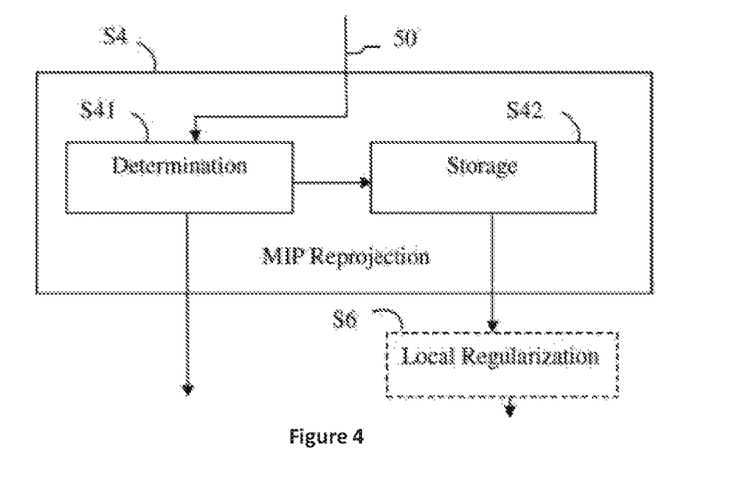
FIG. 4 illustrates as a block diagram, a step for re-projecting reconstructed slices of an object of interest according to an embodiment of the invention.

FIG. 4 illustrates the steps of the MIP reprojection according to a first embodiment.

This type of MIP reprojection consists, for each pixel of the intermediate 2D image 60, in a determination S41, in the reconstructed volume of the object of interest, of the maximum intensity voxel along the ray from the source to this pixel and in storage S42, in a memory unit 14 of the imaging system, of an identifier of the reconstructed slice in which the maximum intensity voxel is found.

In this way, in the memory unit 14, a depth information argMax is available, connecting each pixel of the intermediate 2D image 60 to the associated reconstructed slice from which this pixel stems.

The reprojection may be applied in a different way from the one shown above.

Figure 5:
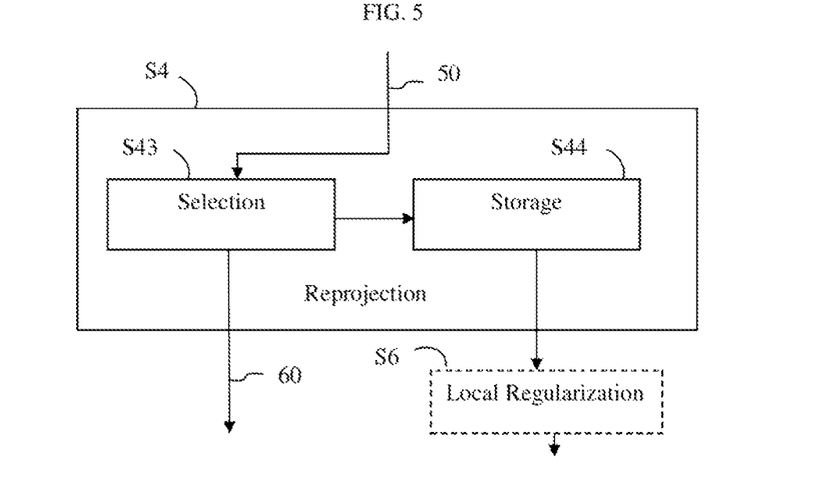
FIG. 5 illustrates, as a block diagram, a step for re-projecting reconstructed slices according to an embodiment of the invention.
Figure 6:
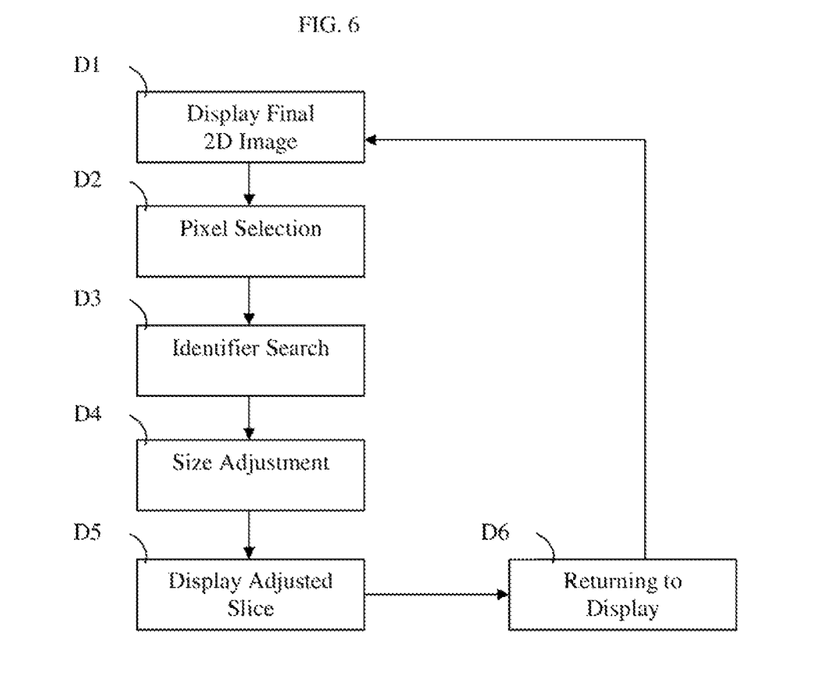
FIG. 6 illustrates as a block diagram, a display method according to the invention.

FIG. 5 illustrates the steps of the reprojection according to a second embodiment.

In this embodiment, the reprojection S4 of the re-construction slices 50 further consists in any pixel of the intermediate 2D image 60 in a selection S43 of the voxel having the highest probability of belonging to a lesion along the ray from the source to this pixel, and in storage S44, in a memory unit 14 of the imaging system, of an identifier of the re-construction slice in which the maximum probability voxel is found.

This assumes that with each voxel is associated a probability of belonging to a lesion. An automatic detection system (3D CAD (Computer Aided Detection)) allows such a volume of probabilities to be obtained.

In this way, in the memory unit 14, depth information argMax is available connecting each pixel of the intermediate 2D image 60 to the associated re-construction slice from which this pixel stems.

The processing method may further comprise a step for local regularization S6, by the processing unit 13, of the depth information argMax. This regularization step consists of uniformizing the information argMax, locally. The result is depth information noted as argMax'.

Advantageously, the method comprises an alternative filtering step S2' for applying via the processing unit 13, a filter to the image acquired in step S1 resulting in projection image 31 of the object of interest O prior to the elaboration S5 of the final 2D image 70 so as to reduce noise. The applied filter is preferably a low-pass filter.

Additionally, it is possible to apply a step S4' for determining reconstructed slices 50' which correspond to the reconstructed volume of the object of interest, in other words this is a volume which is obtained from projection images with the reconstruction methods known from the state of the art, the purpose of which is viewing slices.

Display Method

The processing method described above finds a particular application in a method for displaying radiography images of an object of interest O. The display of the radiography images is carried out by means of a display unit 15 connected to the processing unit 13 applying the display method.

FIG. 5 illustrates steps of the display method.

The display method comprises a step DI for displaying the final 2D image 70 obtained by means of the image processing method described above.

It further comprises a selection of a pixel from the final 2D image 70.

The display method also comprises a search D3 among the depth information argMax or argMax' stored in the memory unit 14, for an identifier of the reconstruction slice associated with the selected pixel.

Following this search, the method comprises a step D4 for adjusting the size of the reconstructed slice with the same identifier to the size of the final 2D image 70, the adjustment factor preferentially depending on the height of the reconstructed slice.

Finally, by means of the display unit, the thereby adjusted reconstructed slice is displayed. By this means, the reconstructed slice and the final 2D image 70 have the same geometrical properties with structures placed in the same location. It is then easier to toggle between the reconstructed slices and the final 2D image 70 and vice versa. Following the display of the adjusted reconstructed slice, it is also possible to return to a display of the final 2D image D6.

Alternatively, the display method may consist in the succession of the following steps: displaying DI a reconstructed slice by means of the display unit 15; adjusting D4 the size of the final 2D image 70 to the size of the reconstructed slice, the adjustment factor preferentially depending on the height of the reconstructed slice; displaying D5, by means of the display unit 15, the adjusted final 2D image 70.

By this means, the reconstructed slice and the final 2D image 70 have the same geometrical properties with structures placed in the same location. It is then easier to toggle between the reconstructed slices and the final 2D image 70 and vice versa.

What is claimed is:

1. A method of processing tomosynthesis images of an object of interest, using an imaging system, the imaging system comprising an X-ray source positioned facing a detector on which the object of interest is positioned, the processing comprising the following steps:
    acquiring a plurality of 2D projection images of the object of interest according to a plurality of orientations located with respect to a perpendicular to the detector, a zero orientation being the closest to the perpendicular;
    applying a filter on the acquired 2D projection images so as to obtain filtered projection images of the object of interest;
    reconstructing slices of the object of interest from at least two of the filtered projection images, the reconstructed slices being a filtered reconstructed volume of the object of interest;
    reprojecting the reconstructed slices according to a determined orientation direction to obtain an intermediate 2D image of the object of interest; and
    using a pixel-to-pixel linear combination of the intermediate 2D image obtained by the reprojection and at least one of the acquired plurality of 2D projection images corresponding to the determined orientation to obtain a final 2D image of the object of interest.

2. The method according to claim 1, wherein the reprojection of the reconstructed slices is a Sorted Intensity Pixel (SIP) reprojection in the determined orientation direction, the SIP reprojection comprising, for each pixel of the intermediate 2D image:
    determining, in the filtered reconstructed volume, an intensity voxel calculated by using sorting of the values of pixels along the ray from the source to the pixel of the intermediate 2D image; and
    storing, in a memory unit of the imaging system, an identifier of the reconstructed slice in which is found the voxel from the sorting, so as to have in the memory unit, depth information connecting each pixel of the intermediate 2D image to the associated reconstructed slice from which this pixel stems.

3. The method according to claim 1, wherein the reprojection of the reconstructed slices is a Maximum Intensity Pixel (MIP) reprojection in the determined orientation direction, the MIP reprojection comprising, for each pixel of the intermediate 2D image:
    determining, in the filtered reconstructed volume, the maximum intensity voxel along the ray from the source to the pixel of the intermediate 2D image; and
    storing, in a memory unit of the imaging system, an identifier of the reconstructed slice in which the maximum intensity voxel is found, so as to have in the memory unit, depth information connecting each pixel of the intermediate 2D image to the associated reconstructed slice from which this pixel stems.

4. The method according to claim 1, wherein the reprojecting of the reconstructed slices is performed by sorting of values of pixels according to their intensity.

5. The method according to claim 4, wherein a voxel having the highest probability of belonging to a lesion along the ray from the source to the pixel is selected.

6. The method according to claim 5, comprising a step for determining a volume, obtained using a system for automatic detection of lesions, wherein each voxel represents a probability of belonging to a lesion.

7. A display method for displaying a set of radiography images of the object of interest by a unit for displaying radiography images, radiography images being the reconstructed slices of the object of interest and a final 2D image of the object of interest obtained by a method of processing tomosynthesis images according to claim 1, the method of processing tomosynthesis images further including the step of:
    storing depth information (argMax') in a memory unit, the display method comprising the steps of:
    displaying the final 2D image on the display unit,
    selecting a pixel from the final 2D image;
    searching, among the depth information (argMax') stored in the memory unit, for an identifier of the reconstructed slice associated with the selected pixel;
    adjusting the size of the reconstructed slice associated with the selected pixel to the size of the final 2D image; and
    displaying by means of the display unit, the adjusted reconstructed slice associated with the selected pixel.

8. The method of claim 1 further comprising:
    displaying the final 2D image obtained from the combination of the tomosynthesis projection image and the reprojection image;
    selecting a pixel from the final 2D image;
    searching among a depth information for an identifier of a reconstructed slice associated with the selected pixel; and
    displaying the reconstructed slice.

9. The method of claim 8, wherein the size of the reconstructed slice is adjusted to the size of the final 2D image.

10. The method of claim 9, wherein an adjustment factor for the adjusting depends on the height of the reconstructed slice.

11. The method of claim 8, wherein the size of the final 2D image is adjusted to the size of the reconstructed slice.

12. The method of claim 11, wherein an adjustment factor for the adjusting depends on the height of the reconstructed slice.

13. The method of claim 8, wherein the final 2D image and the reconstructed slice are displayed concurrently.

14. The method of claim 8 further comprising toggling between the reconstructed slice and the final 2D image.

15. The method of claim 8, wherein the depth information is stored in a memory unit.

16. A method of displaying radiography images of an object of interest using a display unit and a processing unit comprising:
    displaying a final 2D image;
    selecting a pixel from the final 2D image, wherein the final 2D image is obtained from the combination of a 2D projection acquired in a determined orientation and a reprojection of reconstructed slices in the corresponding determined orientation;
    searching among a depth information for an identifier of a reconstructed slice associated with the selected pixel;
    adjusting the size of the identified reconstructed slice to be the same size as the displayed final 2D image; and
    displaying the adjusted reconstructed slice.

17. The method of claim 16, wherein the final 2D image and the reconstructed slice of the object of interest were processed using an imaging system, the imaging system comprising an X-ray source positioned facing a detector on which the object of interest is positioned, the processing comprising the following steps:
- acquiring a plurality of 2D projection images of the object of interest according to a plurality of orientations located with respect to a perpendicular to the detector where at least one of the plurality of orientations includes the determined orientation, a zero orientation being the closest to the perpendicular;
- applying a filter on the acquired 2D projection images so as to obtain filtered projection images of the object of interest;
- reconstructing the slices of the object of interest from at least two of the filtered projection images, the reconstructed slices being a filtered reconstructed volume of the object of interest;
- obtaining an intermediate 2D image of the object of interest by reprojecting the reconstructed slices according to the determined orientation; and
- using a pixel-to-pixel linear combination of the intermediate 2D image obtained by the reprojection and the at least one of the acquired plurality of 2D projection images corresponding to the determined orientation to obtain the final 2D image of the object of interest.

\* \* \* \* \*